United States Patent
Schmidt (10) Patent No.: US 11,391,319 B2
(45) Date of Patent: Jul. 19, 2022

(54) JOINT ARRANGEMENT, PREFABRICATED ASSEMBLY, AND METHOD FOR PRODUCING A PREFABRICATED ASSEMBLY OF A JOINT ARRANGEMENT

(71) Applicant: Heiko Schmidt, Lappersdorf (DE)

(72) Inventor: Heiko Schmidt, Lappersdorf (DE)

( * ) Notice: Subject to any disclaimer, the term of this patent is extended or adjusted under 35 U.S.C. 154(b) by 613 days.

(21) Appl. No.: 16/309,046

(22) PCT Filed: May 10, 2017

(86) PCT No.: PCT/EP2017/061124
§ 371 (c)(1),
(2) Date: Dec. 11, 2018

(87) PCT Pub. No.: WO2018/001613
PCT Pub. Date: Jan. 4, 2018

(65) Prior Publication Data
US 2019/0360521 A1    Nov. 28, 2019

(30) Foreign Application Priority Data

Jun. 27, 2016   (DE) .......................... 102016111708.0

(51) Int. Cl.
*F16C 11/04*     (2006.01)
*F16C 17/10*     (2006.01)
(Continued)

(52) U.S. Cl.
CPC .............. *F16C 11/04* (2013.01); *F16C 17/10* (2013.01); *B21D 53/10* (2013.01); *E05D 5/16* (2013.01);
(Continued)

(58) Field of Classification Search
CPC .............. F16C 11/04; Y10T 403/32606; Y10T 403/32951; Y10T 403/32959
See application file for complete search history.

(56) References Cited

U.S. PATENT DOCUMENTS 3,108,500 A * 10/1963 Merriman ............. B23B 49/023
                                                        408/241 R
4,441,835 A *  4/1984 Davis .................... E05D 15/466
                                                           403/24
(Continued)

FOREIGN PATENT DOCUMENTS

EP          02627346 A1    12/1994
EP           0679559 A1    11/1995
WO       WO2015009166 A1    1/2015

OTHER PUBLICATIONS

Written Opinion of the International Searching Authority for International Application No. PCT/EP2017/061124 (Year: 2018).*

*Primary Examiner* — Michael P Ferguson
(74) *Attorney, Agent, or Firm* — Welsh Flaxman & Gitler LLC (57) ABSTRACT

A joint arrangement between at least one first and second component, preferably sheetlike metal component, which has in each case a top and bottom side including a joint bushing which is received in a first opening of the first component, and a joint pin which is led through the joint bushing and which has a pin head, wherein that pin section which is situated opposite the pin head and which protrudes out of the joint bushing is fastenable to the second component preferably by means of a rivet connection. It is particularly advantageous for a stop disk element to be received between the pin head and the top side of the first component, and for the joint bushing to be formed as a collar bearing with a bushing section received in the first opening and a ring-shaped collar section adjoining said bushing section, wherein the ring-shaped collar section bears against the bottom side of the first component. The invention also relates to a prefabricated component and to a method for producing such a prefabricated component of a joint arrangement.

19 Claims, 6 Drawing Sheets

(51) Int. Cl.
*B21D 53/10* (2006.01)
*E05D 5/16* (2006.01)
*F16B 19/06* (2006.01)
*F16C 33/08* (2006.01)
*F16C 43/02* (2006.01)

(52) U.S. Cl.
CPC .............. *F16B 19/06* (2013.01); *F16C 33/08* (2013.01); *F16C 43/02* (2013.01); *Y10T 403/32959* (2015.01)

(56) References Cited

U.S. PATENT DOCUMENTS

| | | | | |
|---|---|---|---|---|
| 5,033,900 | A * | 7/1991 | Pine | F16B 5/04 403/162 |
| 6,171,011 | B1 * | 1/2001 | Wu | G06F 1/1616 16/337 |
| 7,979,967 | B2 * | 7/2011 | Schmidt | E05D 9/00 29/11 |
| 9,863,468 | B2 * | 1/2018 | Halcom | F16C 11/045 |
| 10,151,335 | B2 * | 12/2018 | Fandl | B23K 31/02 |
| 2004/0013465 | A1 | 1/2004 | Lapointe | |
| 2007/0121278 | A1 * | 5/2007 | Kruger | F16C 11/04 361/600 |
| 2012/0117759 | A1 * | 5/2012 | Lambert | E05D 15/00 16/368 |

* cited by examiner

JOINT ARRANGEMENT, PREFABRICATED ASSEMBLY, AND METHOD FOR PRODUCING A PREFABRICATED ASSEMBLY OF A JOINT ARRANGEMENT

BACKGROUND OF THE INVENTION

The invention relates to a joint arrangement, a prefabricated assembly, and a method for producing a prefabricated assembly of a joint.

Joint arrangements for producing a joint connection between two components or workpieces are required in widely varying sectors of engineering, including, in particular, the automobile sector, for example in linkages between the vehicle body and a moving body element. But also in other sectors of engineering such joint arrangements are needed, which generally consist of a joint bushing held in a component in a manner secured against rotation and a joint pin, which with its bushing section is rotatably or pivotably held in the joint bushing, is secured with a pin head against axial displacement by being supported against the first component or a flange-type section of the bearing or joint bushing and which is fastened in a suitable manner, e.g. by riveting, in the second component.

European Patent No. EP 2 204 257 A2 discloses different variants of such a joint arrangement. These include a sliding bearing bushing or joint bushing inserted into an opening in the first component with a sleeve-type bushing section, to which, when in the connected state, is joined a flange-type bushing section at one free end and a folded-over bushing edge at the opposite free end. The flange-type bushing section and the folded-over bushing edge abut against the edge region of the opening and thus secure the sliding bearing bushing or joint bushing inserted into the first component against rotation. Further, a joint pin is provided made up of a pin head followed by a first and a second pin section, wherein the first pin section has a diameter which is larger than the diameter of the second pin section. The joint pin is received with its first pin section in the sleeve-type bushing section of the sliding bearing bushing or joint bushing, in such a manner that the pin head is supported against the flange-shaped bushing section. The joint pin with its second pin section is passed through an opening in the second component and is anchored there in a manner secured against rotation by means of e.g. riveting. Due to the use of metallic sliding bearing bushings or joint bushings the described joint arrangement requires that the free bushing edge is folded over after inserting the sliding bearing bushing or joint bushing into the opening of the first component, which then forms the bearing and sliding surface for the second component. The quality of the bearing and sliding surface thus depends on the folding over of the free bushing edge, which is a disadvantage.

Furthermore, sliding bearing bushings or joint bushings made of plastic are known, which following insertion into the opening of the first component cannot be reshaped in dimensionally stable manner in order to, in this way, ensure that the sliding bearing bushing or joint bushing is captively secured to the first component.

SUMMARY OF THE INVENTION

On the basis of the foregoing, it is an objective of the invention to propose a joint arrangement with good bearing and sliding properties, a corresponding prefabricated assembly of such a joint arrangement as well as a simple and, in particular, economic method for producing a prefabricated assembly of a joint arrangement.

An essential aspect of the joint arrangement, according to the invention, is seen in that a stop disk element is received between the pin head and the topside of the first component, in that the joint bushing is configured as a collar bearing with a bushing section received in the first opening and an adjoining annular collar section, wherein the annular collar section abuts against the underside of the first component. It is particularly advantageous that the described joint arrangement can be produced quickly and at low cost, in particular, using joint components made of plastic. In particular, as a result of pre-assembling the stop disk element forming part of the joint arrangement on the joint pin, it is very easy to fit the joint pin prepared in this way into the joint bushing configured as a collar bearing and already received in the opening in the first component. Preferably, the stop disk element directly abuts against the pin head and the topside of the first component. To this end, the stop disk element is preferably made of plastic and configured for axial mounting of the joint pin relative to the first component. The joint bushing is made of a thin-walled material, preferably also of plastic or metal, e.g. steel or bronze. The collar bearing is designed as a sliding collar bearing.

The joint bushing which is approximately L-shaped in cross-section is preferably configured such that its bushing section is supported against the first pin section and its annular collar section is supported against the second component. To this end, the joint pin comprises at least a first to third pin sections, which adjoin the pin head one after the other along the pin longitudinal axis and which have different diameters resulting in a joint pin with a multi-step contour.

With a preferred variant, the joint pin comprises at least one first pin section with a first diameter and a first width, a second pin section with a second diameter and a second width and a third pin section with a third diameter and a third width, wherein the first to third diameters and/or the first to third widths are each chosen differently. Preferably the first diameter is larger than the second diameter and the second diameter is larger than the third diameter.

With a further variant, the bushing section of the joint bushing configured as a collar bearing is received in a manner secured against rotation in the first opening of the component and comprises, for example, a ribbing on its outer side for this reason.

Advantageously, the stop disk element and/or the joint bushing configured as a collar bearing, are captively held on the joint pin, wherein preferably the stop disk element is captively held on the first pin section and/or the joint bushing is captively held on the second pin section.

The stop disk element received by the first pin section is secured on the joint pin by, for example, a slight plastic deformation of the material of the joint pin in the region of the step between the first and second pin sections.

Further, in the stepped region between the second and third pin sections, the joint pin comprises an annular projection extending about the pin longitudinal axis, which encloses an annular groove. The joint bushing received in the region of the second pin section is captively secured on the second pin section by a plastic deformation of the annular projection of the second pin section towards the outside, i.e. in radial direction to the pin longitudinal axis.

Further advantageously the stop disk element comprises a central opening, which is arranged to receive the first pin section.

Further advantageously the third pin section protruding from the joint bushing is secured on the second component by means of a rivet connection, preferably in such a manner that the annular collar section is received between the underside of the first component and the topside of the second component.

A further subject of the invention is a prefabricated assembly for producing a joint arrangement comprising at least a first component having a topside and an underside, preferably a sheet-like metal component, a joint bushing received in a first opening of the first component and a joint pin passed through the joint bushing having a pin head. Advantageously, a stop disk element is received between the pin head and the topside of the first component and the joint bushing is configured as a collar bearing with a bushing section received in the first opening and an adjoining annular collar section, wherein the annular collar section abuts against the underside of the first component.

A further subject of the invention is a method for producing a prefabricated assembly between at least a first and a second component each comprising a topside and an underside, the components preferably being sheet-like metal components, where the joint arrangement comprises at least a joint pin with a pin head and several pin sections sequentially arranged along a pin longitudinal axis, a joint bushing and a stop disk element, wherein the joint bushing is configured as a collar bearing with an adjoining annular collar section. Especially advantageously the stop disk element is pushed onto a first pin section directly adjoining the pin head, and the joint bushing is inserted with the bushing section into a first opening of the first component. Subsequently, the prefabricated assembly is produced by inserting the joint pin comprising the pre-assembled stop disk element with a second pin section adjoining the first pin section into the bushing section of the joint bushing and then captively securing the joint bushing on the joint pin.

Advantageously, the joint pin of the prefabricated assembly can be connected, preferably by means of riveting, to the second component via at least one third pin section adjoining the second pin section and extending beyond the joint bushing, thus producing a joint connection between two components quickly and simply by means of the prefabricated assembly.

Further advantageously the stop disk element, after it has been pushed onto the first pin section, is captively secured on the joint pin, namely, in order to captively secure the stop disk element received by the first pin section on the joint pin, the material of the joint pin is plastically deformed in the stepped region of the joint pin between the first and the second pin sections.

Analogously thereto, in order to captively secure the joint bushing received in the second pin section to the joint pin, the material of the joint pin is plastically deformed in the stepped region of the joint pin between the second and third pin sections.

Advantageously, the joint pin is axially mounted between the pin head and the topside of the first component by means of the stop disk element.

In one embodiment of the invention, the bushing section of the joint bushing configured as a collar bearing is inserted in a manner secured against rotation into the first opening of the component, wherein the joint bushing is manufactured from a thin-walled material, preferably plastic or metal, in particular steel or bronze, and the stop disk element is manufactured from plastic.

The expressions "approximately", "essentially" or "roughly" in terms of the invention mean deviations from the respectively exact value by +/−10%, preferably +/−5% and/or deviations in the form of changes unimportant to the function.

Further developments, advantages and possible applications of the invention are revealed in the description of embodiments hereunder and in the figures. All features described and/or illustrated are in principle subject of the invention either on their own or in any random combination, independently of their summary in the claims or their referrals. Also, the contents of the claims are made a constituent part of the description.

BRIEF DESCRIPTION OF THE DRAWINGS

The invention will now be explained in detail by way of the figures of exemplary embodiments, in which:

FIG. 3b shows a lateral view of the stop disk element as per FIG. 3a;

FIG. 3c shows a section along line A-A through the stop disk element as per FIG. 3a;

DETAILED DESCRIPTION OF THE INVENTION

Figure 1:
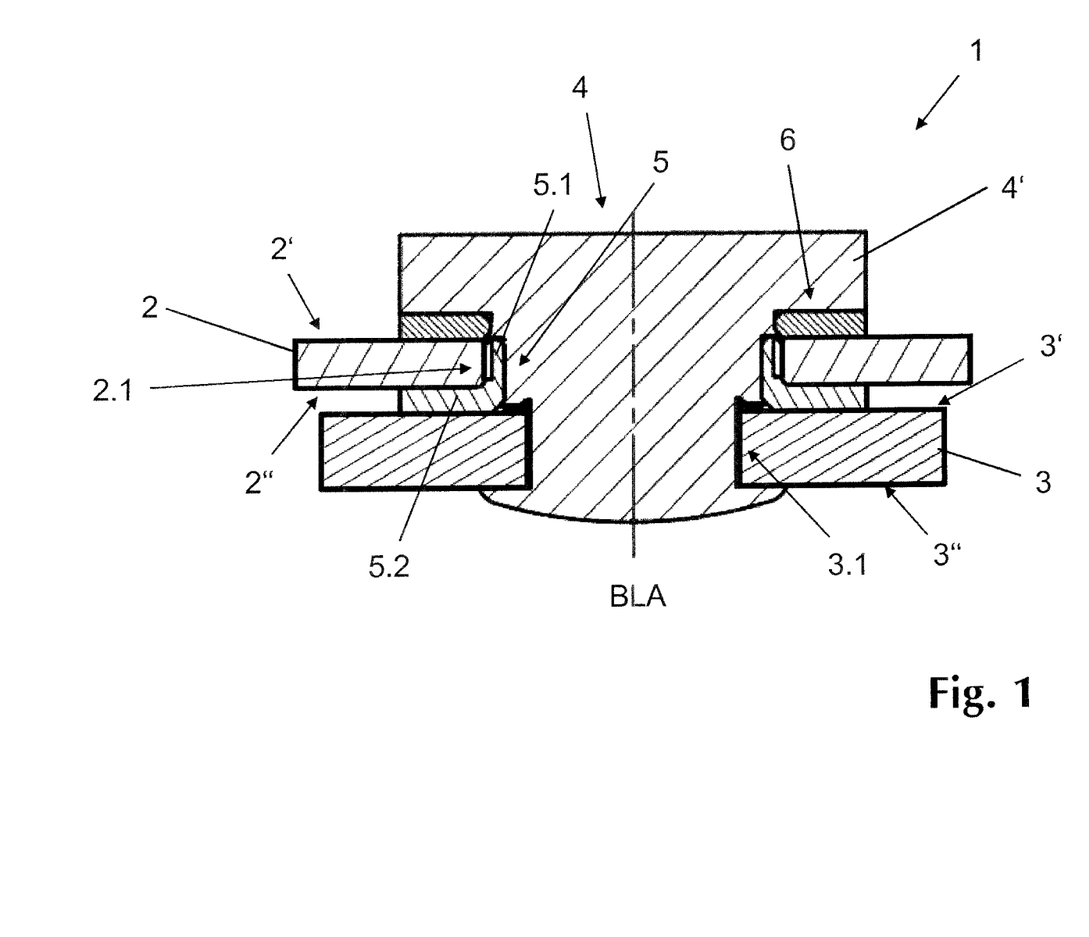
FIG. 1 shows a schematic longitudinal section through a joint arrangement according to the invention.

FIG. 1 by way of example shows a section through a joint arrangement 1 designed according to the invention between a first component 2 and a second component 3, in the assembled state.

The first and second components 2, 3 are preferably workpieces or components made of metal, for example steel sheet which are produced by means of punching and bending. The first component 2 is for example produced by punching from a metallic flat material such as steel sheet, namely in a follow-on or multi-stage tool arranged in a press. The second component 3 is for example an element of a linkage which is articulately connected to the first component 2 via the joint arrangement 1. It is understood that any randomly designed or formed components 2, 3 can be used in principle, which can be connected to each other via a joint arrangement 1 without thereby deviating from the inventive idea.

The joint arrangement 1 according to the invention will now be described by way of a first and a second component 2, 3 designed each as a sheet-like metal component, which are shown merely schematically in the figures. The first and second components 2, 3 each have a topside 2', 3' and an underside 2", 3", which at least in the area of the joint arrangement 1 are shaped flat or planar and thus form a flat or planar support surface at least in the area of the joint arrangement 1.

Figure 2:
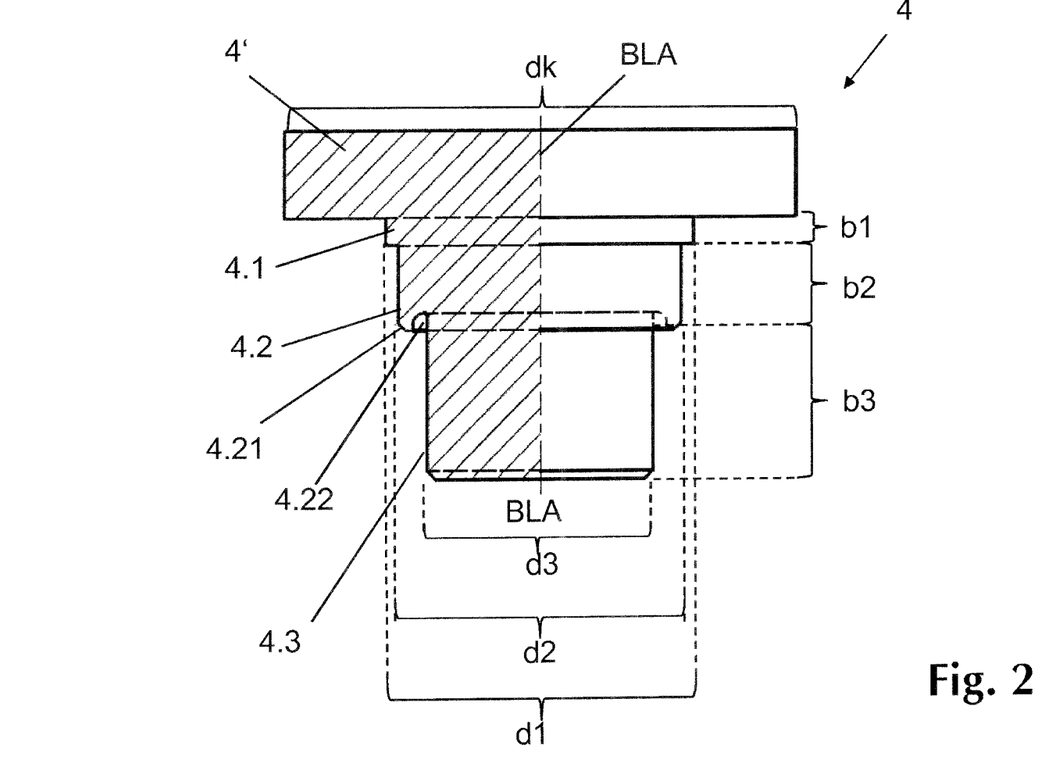
FIG. 2 shows a schematic longitudinal section through/a lateral view of, the joint pin of the joint arrangement according to the invention.

The joint arrangement 1 according to the invention comprises a joint pin 4 extending along a pin longitudinal axis BLA and having a pin head 4' and several pin sections 4.1, 4.2, 4.3 with different diameters d1 to d3 and/or widths b1 to b3, which adjoin the pin head 4' one after the other along the pin longitudinal axis BLA. This results in a multi-step contour of the joint pin 4 along the pin longitudinal axis BLA. FIG. 2 shows an exemplary lateral view or part longitudinal view of such a joint pin 4, respectively. In the assembled state of the joint arrangement 1 as per FIG. 1 the pin longitudinal axis BLA extends perpendicular to the topside 2', 3' and/or underside 2'', 3'' of the sheet-like metal components 2, 3, namely in the area of the joint arrangement 1.

In a preferred embodiment, the joint pin 4 comprises at least one first pin section 4.1 with a first diameter d1, one second pin section 4.2 with a second diameter d2 and one third pin section 4.3 with a third diameter d3, which adjoin the pin head 4' one after the other along the pin longitudinal axis BLA. The first to third diameters d1 to d3 of the first to third pin sections 4.1 to 4.3 diminish starting from the pin head 4' along the pin longitudinal axis BLA, that is, the first diameter d1 is chosen larger than the second diameter d2 and the second diameter d2 is chosen larger than the third diameter d3. Further, the pin head 4' comprises a head diameter dk, which is larger than the first to third diameters d1 to d2, and preferably corresponds to at least two times the third diameter d3 and/or to 1.5 times the first or second diameter d1, d2, respectively.

Finally, the pin sections 4.1, 4.2, 4.3 comprise different widths b1 to b3 along the pin longitudinal axis BLA, that is the first pin section 4.1 comprises a first width b1, the second pin section 4.2 comprises a second width b2 and the third pin section 4.3 comprises a third width b3. The first width b1 is chosen smaller than the second width b2 and the second width b2 is chosen smaller than the third width b3, i.e. the widths b1 to b3 of the pin sections 4.1, 4.2, 4.3 increase starting from the pin head 4' along the pin longitudinal axis BLA.

The different diameters d1 to d3 of the pin sections 4.1 4.2, 4.3 result in a joint pin 4, which has a multi-step contour, wherein in the stepped region between the second and third pin sections 4.2, 4.3 an annular projection 4.21 is created extending about the pin longitudinal axis BLA, which encloses an annular groove 4.22. The annular projection 4.21 is for example produced in that an annular groove 4.22 directly enclosing the third pin section 4.3 is moulded into the annular face of the second pin section 4.2, which is created in the transition between the second and third pin sections 4.2, 4.3 and which extends in a plane at right angles to the pin longitudinal axis BLA. The annular projection 4.21 may for example comprise an outwardly directed chamfer extending obliquely to the pin longitudinal axis BLA. Similarly, the free end of the third pin section 4.3 in one variant comprises for example an outwardly directed chamfer extending obliquely to the pin longitudinal axis BLA.

With the joint arrangement 1 according to the invention a joint bushing 5 is received, at least in sections, in at least one first opening 2.1 of the first component 2, through which the joint pin 4 passes and protrudes towards the outside beyond the joint bushing 5, namely with at least its third pin section 4.3. The joint bushing 5 forms a sliding bearing.

In the present exemplary embodiment, the second pin section 4.2 is received at least section-wise in the first opening 2.1 or it is directly enclosed by the same. The third pin section 4.3 lying opposite the pin head 4' and protruding from the joint bushing 5 can be attached to the second component 3 when the joint arrangement 1 is assembled, namely preferably by means of a rivet connection.

FIG. 1 for example shows such a rivet connection between the third pin section 4.3 and the second component 3, wherein the third pin section 4.3 is guided through a second opening 3.1 in the second component and wherein subsequently the free end thereof which protrudes beyond the second component 3 is appropriately deformed by riveting.

Figure 6:
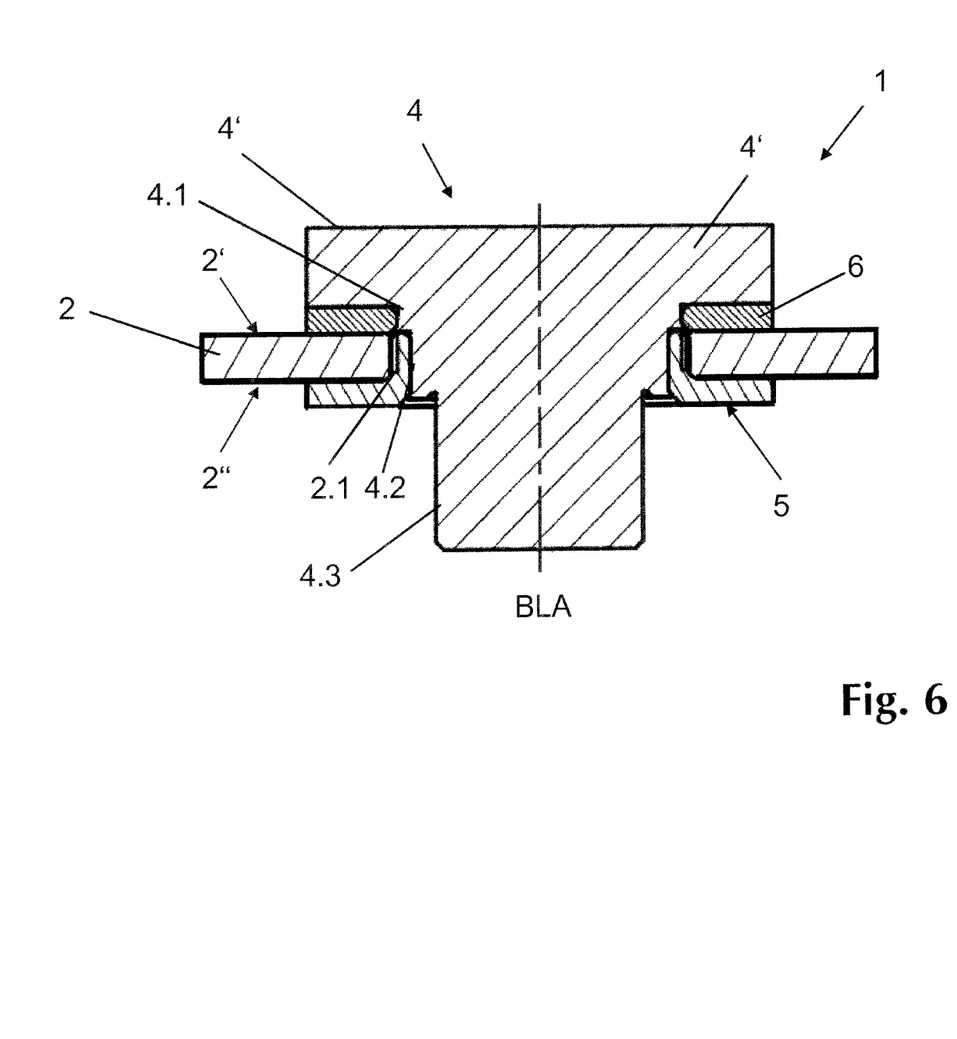
FIG. 6 shows a longitudinal section through a prefabricated assembly comprising a joint arrangement pre-assembled to a first component as per FIG. 1, without a second component.

Alternatively, thereto, FIG. 6 shows a longitudinal section through a prefabricated assembly comprising a first component 2 with a joint arrangement 1 according to the invention, wherein the rivet connection of the free end of the third pin section 4.3 to the second component 3 is not manufactured until at a later stage in the manufacturing process.

According to the invention with the joint arrangement 1 a stop disk element 6 is received between the pin head 4' and the topside 2' of the first component 2, and the joint bushing 5 is configured as a collar bearing, in particular a collar sliding bearing with a bushing section 5.1 received by the first opening 2.1 and an adjoining annular collar section 5.2, wherein the annular collar section 5.2 is received between the underside 2' of the first component 2 and the topside 3' of the second component 3. The bushing section 5.1 and the annular collar section 5.2 extend thus, when assembled, concentrically about the pin longitudinal axis BLA, wherein the bushing section 5.1 is shaped as a sleeve and the annular collar section 5.2 is arranged in a plane oriented parallel to the underside 2' of the first component 2 or the topside 3' of the second component 3.

Here the annual collar section 5.2 forms a central lead-through opening 5.3, which adjoins the annual collar section 5.2 such that the wall of the joint bushing 5 forming the bushing section 5.1 extends concentrically to the centre longitudinal axis of the central lead-through opening 5.3, wherein when assembled the joint pin 4 is received with its second pin section 4.2 in the central lead-through opening 5.3. The dimensions of the central lead-through opening 5.3 or the annual collar section 5.2 are adapted to the dimensions of the second pin section 4.2. In particular the centre longitudinal axis of the central lead-through opening 5.3 coincides with the pin longitudinal axis BLA.

Figure 5A:
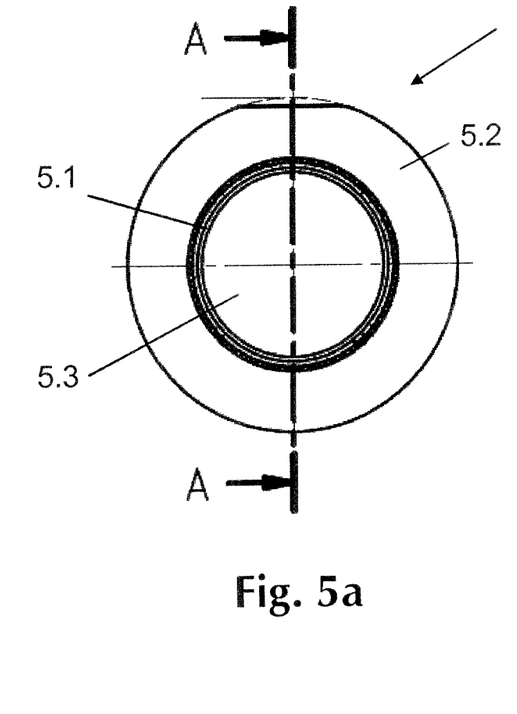
FIG. 5a shows a top view of a joint bushing configured as a collar bearing.
Figure 5B:
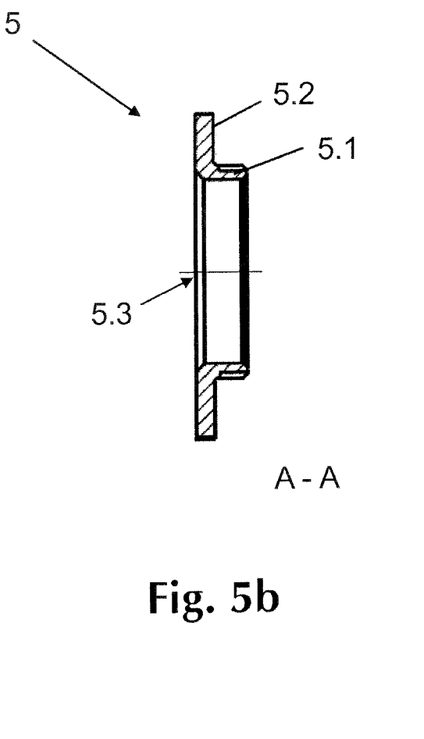
FIG. 5b shows a section along line A-A through the joint bushing configured as a collar bearing as per FIG. 5b.

The transition area between the sleeve-type bushing section 5.1 and the annular collar section 5.2 is preferably rounded-off, as can, for example, be recognised in FIGS. 1, 5b and 6. The joint bushing 5 is preferably made of a thin-walled material suitable for manufacturing joint bushings 5, for example plastic or metal, in particular, steel or bronze. Sliding bearing bushings 5 made of plastic are especially preferred because they are cost-effective and maintenance-free.

In a further preferred variant, the joint bushing 5 formed as a collar bearing comprises a ribbing on the outer side of the bushing section 5.1, which preferably extends along the pin longitudinal axis BLA or the centre longitudinal axis of the central lead-through opening 5.3, respectively. The ribbing ensures that assembly of the joint bushing 5 in the first opening 2.1 of the first component 1 can be affected in a manner secured against rotation.

The stop disk element 6 is formed as a disc with a central opening 6.1, which is provided for leading through and receiving the pin section 4.1. Preferably, the diameter of the central opening 6.1 corresponds to at least the first diameter d1 of the first pin section 4.1, namely such that the stop disk element 6 can be pushed onto the first pin section 4.1 and comes to a stop at the pin head 4'. The inner edge section 6' of the stop disk element 6 enclosing the central opening 6.1 of the stop disk element 6 preferably comprises a chamfer on both sides, which extends obliquely to the centre longitudinal axis of the central opening 6.1 or the pin longitudinal axis BLA, respectively, when assembled.

The stop disk element 6 is preferably made of plastic and serves for planar axial mounting of the joint pin 4 relative to the first component 2, in particular the pin head 4' relative to the topside 2' of the first component 2.

Such stop disk elements 6 made of plastic are particularly advantageous because they do not require lubricant or maintenance and are known from the state of the art as regards design and function. Preferably, the stop disk element 6 has an outer diameter which for example corresponds to the pin diameter dk of the pin head 4'.

Figure 3A:
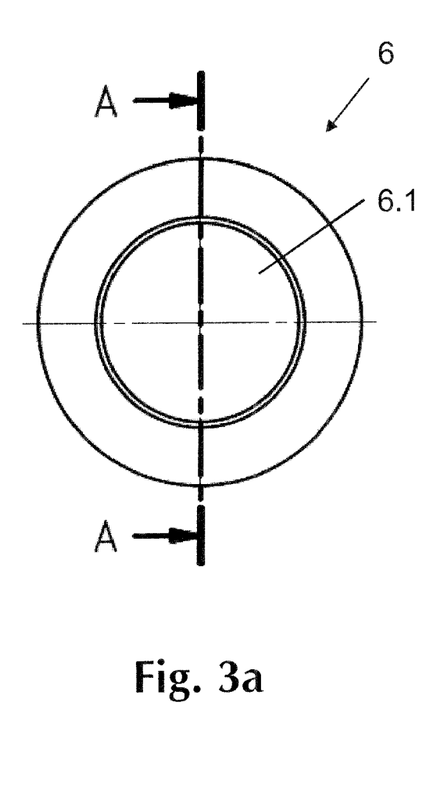
FIG. 3a shows a top view of a stop disk element.
Figure 3B:
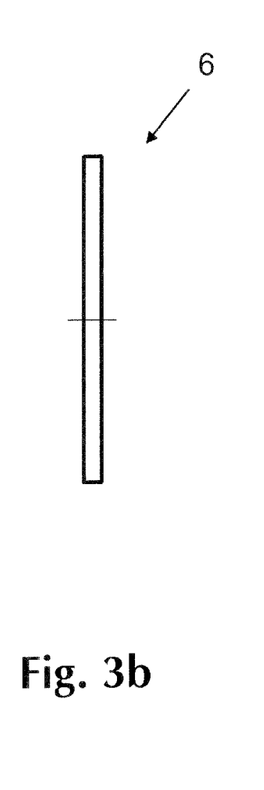
Figure 3C:
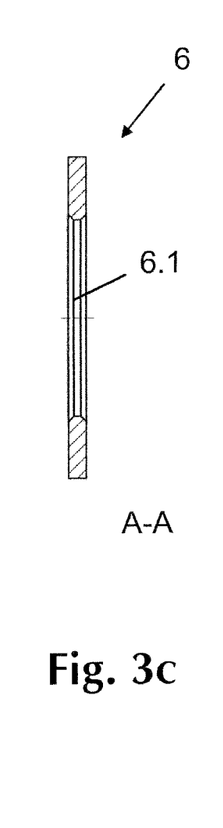

In FIGS. 3a to 3c different views of such a stop disk element 6 are shown, i.e. FIG. 3a shows a top view of the topside of the stop disk element 6, FIG. 3b shows a side view of the stop disk element 6 and FIG. 3c shows a section along line A-A through the stop disk element 6 as per FIG. 3a. FIG. 3c in particular reveals the two chamfers lying opposite each other in the inner edge area of the stop disk element 6, which encloses the central opening 6.1.

Figure 4:
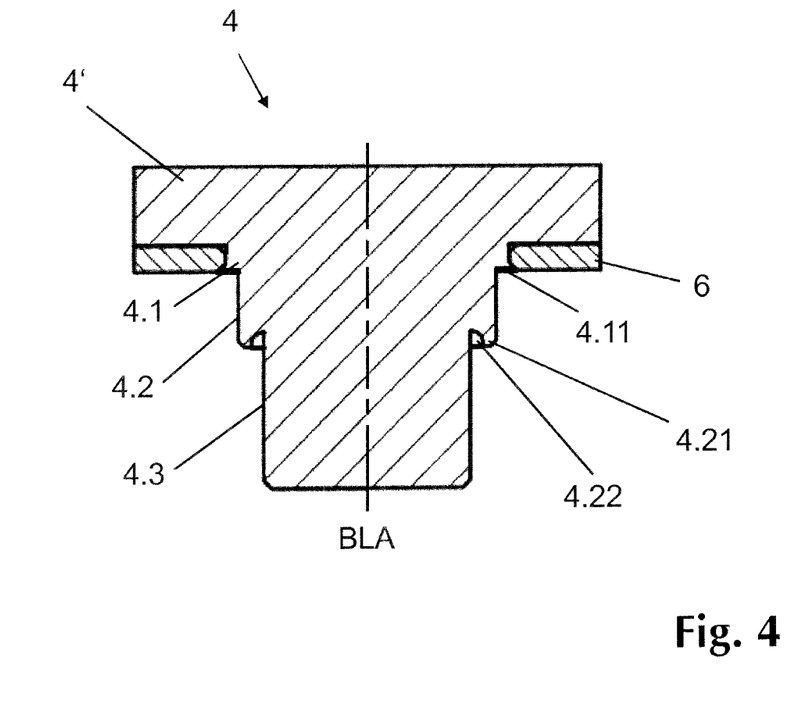
FIG. 4 shows a schematic longitudinal section through a joint pin as per FIG. 2 with a stop disk element as per FIGS. 3a-3c mounted thereto.

FIG. 4 shows for example a longitudinal section through a joint pin 4 with an assembled or pre-assembled stop disk element 6. The stop disk element 6 received by the pin section 4.1 is secured, preferably captively secured, on the joint pin 4 in this variant by a slight plastic deformation (caulking) of the material of the joint pin 4 in the region of the step between the first and second pin sections 4.1, 4.2. To this end the free edge of the step is deformed into a projection 4.11 annularly extending approximately concentrically about the pin longitudinal axis BLA into the chamfer of the stop disk element 6. The annular projection 4.11 extends slightly beyond the circumference of the first pin section 4.1 and is received by the chamfer of the stop disk element 6. Plastic deformation of the joint pin 4 is preferably affected by means of a suitable forming tool, in particular a caulking tool.

After assembly or pre-assembly of the stop disk element 6 on the first pin section 4.1 of the joint pin 4 has been completed, in order to produce the joint arrangement 1 the joint pin together with pre-assembled stop disk element 6 is passed through the first opening 2.1 of the first component 2, namely through the joint bushing 5 configured as a collar bearing, which is already received in the first opening 1 or has been introduced in a common assembly step. To this end the first joint sleeve 5 with its bushing section 5.1 is inserted from the underside 2" of the first component 2 into the first opening 2.1 and the joint pin 4 with its second and third pin sections 4.2, 4.3 is passed through the lead-through opening 5.3 enclosed by the annular bushing section 5.1 of the joint bushing 5, i.e. such that the second bushing section 4.2 is preferably completely received by the annular bushing section 5.1 and the free frontal edge of the bushing section 5.1 is supported against the step surface formed between the first and second pin sections 4.1, 4.2 or against the frontal annular surface of the first pin section 4.1, which extends in a plane at right angles to the pin longitudinal axis BL. The topside 2' of the first component 2 directly adjoins the stop disk element 6 along the pin longitudinal axis BLA or comes into contact with the same. The annular collar section 5.2 of the joint bushing 5 inserted with its bushing section 5.1 into the first opening 2.1 comes into contact with the underside 2" and thus directly adjoins the first component 2. The stop disk element 6 and the joint bushing 5 configured as a collar bearing thus enclose the first opening 2.1 of the first component 2 thereby forming the joint arrangement 1.

To secure the joint bushing 5 on the joint pin 4 the annular projection 4.21 is plastically deformed in the stepped transition area between the second and third pin sections 4.2, 4.3, towards the outside, i.e. in radial direction to the pin longitudinal axis BLA, in such a manner that the same engages behind the rounded-off transition area between the bushing section 5.1 and the annular collar section 5.2 in the region of the end of the lead-through opening 5.3 which lies opposite the pin head 4'. In this way both the stop disk element 6 in the region of the first pin section 4.1 and the joint bushing 5 in the region of the second pin section 4.2 are captively secured to the joint pin 4.

The joint arrangement 1 assembled in such a way on the first component 2 forms for example a prefabricated assembly, in particular a joint assembly as per FIG. 6, which as part of the preferably automatic manufacturing process is connected to the second component 3 for producing the joint connection between the two components 2, 3. To this end, as previously described, the joint pin 4 protruding outwards from the joint bushing 5 with its third pin section 4.3 is passed through the second opening 3.1 in the second component 3 and firmly connected to the same, preferably riveted, for example anchored there by means of an orbital riveting process.

Production of the first component 2 is for example effected in a working apparatus, for example by means of a follow-on or multi-stage tool, in which the first components 2 are produced in several working steps for example by punching and forming and during which, among others, the first opening 2.1 is also formed in the respective component 2. This follow-on or multi-stage tool is also used for introducing the joint bushing 5, for inserting the joint pin 4 provided with the stop disk element 6 and for securing the joint pin 4 in the joint bushing 5, i.e. such that the joint pin 4 is, albeit, rotatably received in the respective joint bushing 5, but is secured against dropping out of the joint bushing 5. Due to the inventive combination and arrangement of the joint bushing 5 and the associated stop disk element 6 loss-prevention is especially advantageously ensured even if both components are made of plastic.

In the present variant the first width b1 of the first pin section 4.1 approximately corresponds to the material thickness of the stop disk element 6, and the second width b2 of the second pin section 4.2 approximately corresponds to the material thickness of the first component 2 in the joint area and to the material thickness of the annular collar section 5.2 of the joint bushing 5. The third width b3 of the third pin section 4.3 is preferably chosen larger than the material thickness of the second component 3 in the joint area in order to permit riveting of the free end.

The invention further relates to a method for producing a previously described joint arrangement 1 between at least a first and a second component 2, 3 each comprising a topside and an underside 2', 3' 2", 3". The joint arrangement 1 to be produced comprises at least the joint pin 4 with the pin head 4' and the pin sections 4.1, 4.2, 4.3 sequentially arranged along a pin longitudinal axis BLA, the joint bushing 5 and the stop disk element 6, wherein the joint bushing 5 according to the invention is made as a collar bearing with a bushing section 5.1 and an adjoining annular collar section 5.2. In one variant the stop disk element 6 is pushed onto the first pin section 4.1 directly adjoining the pin head 4' and preferably pre-assembled thereto. Preferably the stop disk element 6 is non-detachably secured on the joint pin 4 after the first pin section 4.1 has been pushed on.

The thus prepared joint pins 4 with stop disk element 6 pre-assembled thereto in a loss-proof manner are, in a next step, inserted into the bushing section 5.1 of the joint pin, wherein however, the joint bushing 5 with the bushing section 5.1 has in advance been inserted into a first opening 2.1 of the first component 2, i.e. it is not until after this that, in order to produce the joint arrangement 1, the joint pin 4 comprising the pre-assembled stop disk element 6 is inserted with a second pin section 4.2 adjoining the first pin section 4.1 into the bushing section 5.1 of the joint pin and the joint bushing 5 is captively secured on the joint pin 4. This may be done, for example, in one go using a follow-on tool or in several stages using different tools.

A thus prefabricated component 2 with joint arrangement 1 is subsequently preferably connected to the second components 3 by means of riveting. To this end the joint pin 4 is connected to the second component 3, preferably by means of riveting, via at least the third pin section 4.3 directly adjoining the second pin section 4.2 and protruding beyond the joint bushing 5.

By means of the joint arrangement 1 according to the invention, the joint pin 4 is axially mounted by means of the stop disk element 6 between the pin head 4' and the topside 2' of the first component 2 by means of the joint bushing 5, namely in such a way that the first component 2 is rotatably connected to the second component 3 about the pin longitudinal axis BLA. To this end the joint bushing 5 is preferably made of a thin-walled material and the stop disk element 6 is made of plastic.

The stop disk element 6 received by the first pin section 4.1 is non-detachably secured on the joint pin 4 in that the stepped region of the joint pin 4 between the first and second pin sections 4.1, 4.2 is plastically deformed, namely as described above. Analogously thereto, in order to secure the joint bushing 5 received by the second pin section 4.2 on the joint pin against loss, the stepped region of the joint pin 4 between the second and third pin section 4.2, 4.3 is plastically deformed.

The invention has been described above by way of exemplary embodiments. It is understood that numerous modifications and variations are possible without deviating thereby from the inventive idea on which the invention is based.

LIST OF REFERENCE NUMERALS 1 joint arrangement
2 first component
2' topside
2" underside
2.1 first opening
3 second component
3' topside
3" underside
3.1 second opening
4 joint pin
4' pin head
4.1 first pin section
4.11 annular projection
4.2 second pin section
4.21 annular projection
4.22 annular groove
4.3 third pin section
5 joint bushing
5.1 bushing section
5.2 annular collar section
5.3 lead-through opening
6 stop disk element
6.1 central opening
b1 first width
b2 second width
b3 third width
BLA pin longitudinal axis
d1 first diameter
d2 second diameter
d3 third diameter
dk pin head diameter

The invention claimed is:

1. A joint arrangement between at least one first component and one second component, the at least one first component and one second component having a topside and an underside, the joint arrangement comprising:

a joint bushing received in a first opening of the first component and a joint pin which is passed through the joint bushing and which has a pin head, a pin section lying opposite the pin head and protruding from the joint bushing is adapted to be fastened to the second component by a rivet connection, and a stop disk element received between the pin head and the topside of the first component, wherein the joint bushing is a collar bearing having a bushing section received in the first opening of the first component and an adjoining annular collar section between the first and second components, and the adjoining annular collar section abuts against the underside of the first component, wherein the joint pin comprises at least a first pin section, a second pin section, and a third pin section which are joined to the pin head one after another along a pin longitudinal axis of the joint pin and the first pin section, the second pin section and the third pin section have different diameters resulting in the joint pin having a multi-step contour, wherein the stop disk element comprises an opening arranged to receive the first pin section, wherein the stop disk element is captively secured on the first pin section of the joint pin by a plastic deformation of material of the joint pin in the stepped region between the first pin section and the second pin section, the joint bushing is captively held on the joint pin, and the joint bushing is securely held on the second pin section of the joint pin by a plastic deformation of material of the joint pin in the stepped region between the second and the third pin sections, wherein the bushing section of the joint bushing is supported against the stepped region between the first and second pin sections of the joint pin, and wherein the third pin section protrudes from the joint bushing and is attached to the second component by a rivet connection.

2. The joint arrangement according to claim 1, wherein the stop disk element directly abuts against the pin head and the topside of the first component.

3. The joint arrangement according to claim 1, wherein the first pin section has a first diameter and a first width, the second pin section has a second diameter and a second width, and the third pin section has a third diameter and third width, the first width, the section width and the third width have different sizes.

4. The joint arrangement according to claim 3, wherein the first diameter is larger than the second diameter and the second diameter is larger than the third diameter.

5. The joint arrangement according to claim 3, wherein the joint pin, in a region between the second pin section and the third pin section, comprises an annular projection extending about a pin longitudinal axis of the joint pin, which encloses an annular groove.

6. The joint arrangement according to claim 5, wherein the adjoining annular collar section is received between the underside of the first component and the topside of the second component.

7. The joint arrangement according to claim 1, wherein the bushing section of the joint bushing is a collar bearing received in the first opening of the first component in a manner secured against rotation.

8. The joint arrangement according to claim 7, wherein the bushing section of the joint bushing is a collar bearing comprising a ribbing on an outer side thereof.

9. The joint arrangement according to claim 1, wherein the stop disk element is made of plastic.

10. The joint arrangement according to claim 1, wherein the stop disk element is mounted in a planar axial manner of the joint pin relative to the first component.

11. The joint arrangement according to claim 1, wherein the joint bushing is a thin-walled material.

12. A prefabricated assembly comprising the joint arrangement as claimed in claim 1, wherein the joint bushing is configured as a collar bearing with the bushing section received in the first opening of the first component and the adjoining annular collar section, and the adjoining annular collar section abuts against the underside of the first component.

13. A method for producing the prefabricated assembly as claimed in claim 12, the method comprising the steps of:
pushing the stop disk element onto the first pin section directly adjoining the pin head and the joint bushing; and
inserting the bushing section into the first opening of the first component, wherein subsequently, in order to produce the joint arrangement, the joint pin comprising the pre-assembled stop disk element is inserted with the second pin section adjoining the first pin section into the bushing section of the joint bushing and the joint bushing is then captively secured to the joint pin.

14. The method according to claim 13, wherein the stop disk element, once pushed onto the first pin section, is captively secured on the joint pin.

15. The method according to a claim 13, wherein the joint pin is axially mounted between the pin head and the topside of the first component by the stop disk element.

16. The method according to claim 13, wherein the bushing section of the joint bushing configured as a collar bearing is inserted in the first opening of the first component in a manner secured against rotation.

17. The method according to claim 13, wherein the joint bushing is made of a thin-walled material and the stop disk element is made of plastic.

18. The method according to claim 13, whereby in order to captively secure the stop disk element received by the first pin section on the joint pin, a material of the joint pin is plastically deformed in the stepped region of the joint pin between the first pin section and second pin section.

19. The method according to claim 13, whereby in order to captively secure the joint bushing received by the second pin section, a material of the joint pin is plastically deformed in the stepped region of the joint pin between the second pin section and third pin section.

* * * * *